March 26, 1940.  P. HIRSCH  2,194,657
HYDRAULIC BRAKE MECHANISM
Filed June 30, 1937
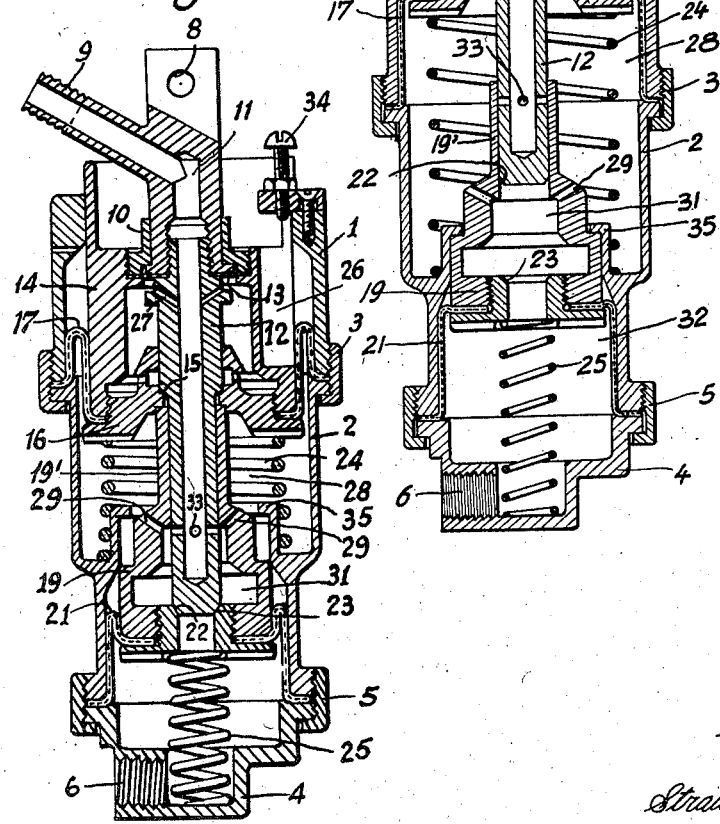
Inventor:
Peter Hirsch
Strauch & Hoffman
Attorneys Patented Mar. 26, 1940

2,194,657

UNITED STATES PATENT OFFICE 2,194,657

HYDRAULIC BRAKE MECHANISM

Peter Hirsch, Berlin-Charlottenburg, Germany

Application June 30, 1937, Serial No. 151,248
In Germany June 30, 1936

5 Claims. (Cl. 60—54.6)

The present invention relates to hydraulic brake mechanisms and more particularly to compound piston arrangements for use in vehicle brake systems.

Usually the brake jaws of pressure liquid brakes are so moved that the distance they have to travel to come into a position in which they bear against the opposite brake surface is traversed as quickly as possible whereby a relatively great stroke is available for the operator to apply the brake for building up the brake pressure proper, so that he may notice the degree of pressure and be able to regulate the latter. To obtain this object various devices have already become known. In particular compound piston assemblies have been employed for this purpose. These compound piston assemblies operate in such a manner, that a large piston, having at a given length of stroke a greater feeding capacity, first of all applies the brake jaws against the brake surface, whereupon a smaller piston is rendered effective for building up the brake pressure proper. The greater piston, therefore, is rendered inoperative at a certain moment, i. e. each time the brake jaws occupy the position in which they bear against the opposite brake surface.

In most known compound piston assemblies, the point at which the larger piston is rendered inoperative is dependent upon the pressure prevailing in the brake pipe system and opposing the movement of the piston. This arrangement is sometimes poor because this pressure is determined mainly by the brake pipe resistance and reaches such a high value during fast movements of the larger piston due to quick application of the brake that the larger piston is soon rendered inoperative. The smaller piston must then perform the movement of the brake jaws to position against the brake surfaces and this movement is necessarily slow because of the relatively long stroke of the smaller piston. Furthermore, the smaller piston may even reach the end of its stroke before proper positioning of the brake jaws, in which case the brake would not act at all.

Moreover, compound piston assemblies are also known in which the change-over from the large piston to the small piston depends on the stroke and which therefore do not have the above mentioned drawbacks of the pressure change-over. These known compound piston assemblies, however, also have a drawback, because the change-over is predetermined once for all by the construction of the piston and the cylinder, so that the larger piston can feed a predetermined amount of liquid only until the change-over to the small piston is effected. For several reasons it is, however, highly desirable to be able to regulate the amount of liquid fed by the large piston. The amount of liquid required for applying the brake first of all depends on the length and diameter of the brake pipes which even with brakes of the same construction cannot be maintained absolutely equal. Differences in the atmospheric pressure also, which often occur to a substantial degree with flying machines, cause an alteration of the amount of liquid required for applying the brake. Finally it is also highly desirable, to so construct the piston that it may be used in connection with various brake constructions.

All these requirements are fulfilled by the compound piston assembly forming the subject matter of the application, and this is obtained by the special construction of the control device which in a well known manner serves for the adjustment of the stroke movement of the large piston. By means of this special construction according to the invention the stepped piston is so arranged, that the large piston may be adjusted with regard to the small piston.

Further features and advantages of the invention are disclosed in the following description.

Figure 1 is a side elevation in section of a compound piston assembly embodying the present invention with the parts shown in the position they occupy before the brakes are applied.

Figure 2 is a side elevation in section similar to Figure 1 but illustrating the relative positions of the parts with the brakes applied.

The pump illustrated in the drawing has two cylinder chambers which are formed by two step-like members 1 and 2 screwed together by means of a threaded ring 3. The bottom 4 is connected to the member 2 by a corresponding ring 5 and has an opening 6 leading to the brake pipe system. The piston rod consists of a plurality of parts. The upper part 7 of the piston rod is provided with an eye 8, serving to connect said part to the driving gear, and with a pipe 9 leading to a storage or compensating tank for the pressure liquid. The pipe 9 discharges into a bore 11 of the upper part 7 of the piston rod. The lower end of this part 7 is internally threaded and screwed into this thread is the lower piston rod 12, provided with a corresponding thread and formed as a tube. Between the upper shoulder of the piston rod 12 and the lower end of the rod 7 a diaphragm 13 is arranged with its outer circumference clamped between an annular projection of the cover 14 and a ring 10 threaded into the upper recess of the cover 14. About midway of its length the rod 12 has an inclined step 15 formed as a valve seat and adapted to cooperate with a corresponding surface of the large piston 16. The piston 16 is screwed into the lower end of the cover 14, and between these two parts the usual diaphragm 17 is clamped. Fixed to the smaller piston is a diaphragm 21. The lower edges of the two diaphragms 17 and 21 are clamped between the walls of the cylinders 1 and 2 and 2 and 4 respectively.

The upper end of the smaller piston 19 is provided with a tube-like extension 19' in which the rod 12 may slide. The lower end of the rod 12 is provided with another valve surface 22 which may cooperate with a corresponding valve seat 23 in the small piston 19. Compression springs 24 and 25 act upon the large piston and the small piston respectively. As a counter-bearing against the pressure of these springs a projection 35 for the small piston 19 is provided in the interior of the casing 1, 2. The upper end of the projection 35 is provided with an annular inwardly directed flange against which the piston 19 may bear. The large piston 16 bears against the lower end of a screw 34 the purpose of which will be explained later on.

The individual liquid paths may best be explained by a description of the operation of the pump.

If the piston rod 7 is moved downwardly, the diaphragm 13 is deformed, whereby the liquid contained in the space 26 above the large piston 16 may flow through the bores 27 into the bore of the piston rod 12, from where it may reach the compensating tank. On the other hand, the liquid may also flow through the slot between the valve seat 15 and the piston 16 into the large cylinder space 28. After a short stroke, the valve is closed at 15 and then the rod 12 pushes the piston 16 and the cover 14 connected to same as well as all parts connected thereto downwardly. The end of the piston rod thereby slides in the extension 19' of the lower piston 19. The brake pressure liquid present in the large cylinder space 28 is thereby pressed through the bore 29 and the space 31 into the lower smaller piston space 32 from where it flows through the opening 6 into the brake pipe system.

After the large piston has performed a stroke corresponding to the distance of the valve surface 22 from the associated valve seat 23, the connection between the large cylinder space 28 and the space 32 is closed. Simultaneously the lower smaller piston is now moved by the piston rod 12. Near the lower end of the rod 12 cross bores 33 are provided which are uncovered by the extension 19' at the very moment in which the valve surface 22 and 23 come into contact. Hereby the necessary usual connection between the compensating tank and the large cylinder space 28 is provided by way of the bores 29 and 33 as shown in Figure 2.

During the above described first portion of the entire piston stroke the large piston feeds the brake liquid to the brakes and brings the brakes into contact with the corresponding brake surface. At this moment which with the construction according to the invention may be predetermined the large piston is rendered inoperative and the brake pressure proper is now built up by the small piston only. A definite piston stroke, therefore, determines the amount of liquid fed by the large piston which is of particular advantage for the reason that the liquid capacity of the various brakes is usually different until the brake jaws bear against the associated surfaces. This capacity may also change due to wear of the brake surface. To compensate for this variation according to the invention a screw 34 is provided at the cylinder ring 1 by the adjustment of which the stroke of the large piston 16 may be altered relatively to the stroke of the small piston 19.

If the brake lever is released, both pistons move upwardly again under the action of the springs 24 and 25 until they occupy the position shown in the drawing in Figure 1 in which both cylinder spaces are connected to the compensating tank by way of the bores 31, 29, the valve 15 and the bore 11.

What I claim is:

1. In apparatus adapted to be connected to a hydraulic brake conduit, fluid storage means, a cylinder in fluid communication with said conduit, a movable piston in said cylinder for building up fluid pressure in said conduit, a piston rod for moving said piston having an internal bore in fluid communication with said fluid storage means, and means for simultaneously disconnecting said cylinder from fluid communication with said conduit and connecting said cylinder to said bore at a predetermined point in the stroke of said piston.

2. Apparatus adapted to be connected to a hydraulic brake system comprising a relatively large cylinder and a relatively small cylinder, a movable piston in each of said cylinders to build up pressure in said brake system, a piston rod actuating said pistons, means carried by said piston rod for disconnecting said large cylinder from said brake system at a predetermined point in the stroke of its piston, means for simultaneously connecting said cylinder with the pressure fluid supply for subjecting the brake system to the pressure built up by the small piston only and means for adjusting the stroke of the large piston independently of the functioning of the smaller piston.

3. Apparatus adapted to be connected to a hydraulic brake system comprising a relatively large cylinder and a relatively small cylinder, a movable piston in each of said cylinders to build up pressure in said brake system, a piston rod actuating said pistons, a central bore in said piston rod communicating with said pressure fluid supply, means carried by said piston rod for disconnecting said large cylinder from said brake system at a predetermined point of the stroke of its piston, lateral openings in said piston rod for simultaneously connecting said large cylinder with said bore, means for subjecting the brake system to the pressure built up by the small piston only and means for adjusting the stroke of the large piston independently of the functioning of the smaller piston.

4. Apparatus adapted to be connected to a hydraulic brake system comprising a relatively large cylinder and a relatively small cylinder, a movable piston in each of said cylinders to build up pressure in said brake system, a piston rod actuating said pistons, a central bore in said piston rod communicating with said pressure fluid supply, cooperating valve members provided on said rod and said small piston for disconnecting said large cylinder from said brake system at a predetermined point in the stroke of its piston, lateral openings in said piston rod for simultaneously connecting said large cylinder with said bore, means for subjecting the brake system to the pressure built up by the small piston only and means for adjusting the stroke of the large piston independently of the functioning of the smaller piston.

5. In apparatus adapted to be connected to a hydraulic brake conduit fluid storage means, a cylinder in fluid communication with said conduit, a movable piston in said cylinder for building up fluid pressure in said conduit, a piston rod for moving said piston, means carried by said piston rod for simultaneously disconnecting said cylinder from fluid communication with said conduit and connecting the same to said fluid storage means at a predetermined point in the stroke of said piston.

PETER HIRSCH.